United States Patent [19]

Hamert

[11] Patent Number: 4,614,443

[45] Date of Patent: Sep. 30, 1986

[54] THERMAL SENSOR FOR CHEMICAL REACTOR

[75] Inventor: Jean-Marie Hamert, Hoenheim, France

[73] Assignee: Societe de Dietrich & Cie, Niederbronn les Bains, France

[21] Appl. No.: 675,985

[22] Filed: Nov. 29, 1984

[51] Int. Cl.$^4$ .......................... G01K 1/14; G01K 7/00
[52] U.S. Cl. ................................... 374/163; 136/221; 136/230; 374/179; 374/208; 403/349
[58] Field of Search .............. 374/208, 209, 210, 135, 374/136, 116, 112, 138, 137, 147, 148, 155, 179, 193, 194; 220/300, 301; 403/349, 183, 184; 339/88, 90, 89; 29/612; 136/221, 230

[56] References Cited

U.S. PATENT DOCUMENTS

| 2,839,594 | 6/1958 | Schneidersmann | 374/179 |
|---|---|---|---|
| 3,322,416 | 5/1967 | Ostberg | 374/155 |
| 3,555,489 | 1/1971 | Brickle et al. | 339/88 R |

FOREIGN PATENT DOCUMENTS 2337252  1/1975  Fed. Rep. of Germany .... 339/88 R

Primary Examiner—Daniel M. Yasich
Attorney, Agent, or Firm—Robert E. Burns; Emmanuel J. Lobato; Bruce L. Adams

[57] ABSTRACT

A thermal sensor, in particular for a chemical reactor comprises an enamelled cylindrical shell having at its inner end a thin base and an inner sleeve welded to the base of the shell. A temperature measuring head comprising at least one thermal sensing element in a compression resistant insulating mass of low thermal inertia in a casing is pressed against the base of the shell by a comression spring acting between the temperature measuring head and a connector coupled to the inner sleeve of the shell by a bayonet point. Lead wires from the temperature measuring head extend out through a tubular stem having at its inner end a socket connected with the connector by a second bayonet joint. A guide sleeve has an inner end surrounding the inner sleeve of the shell and a reduced diameter outer end receiving the tubular stem. The bayonet joints provide for easy removal and replacement of the temperature measuring head.

5 Claims, 13 Drawing Figures

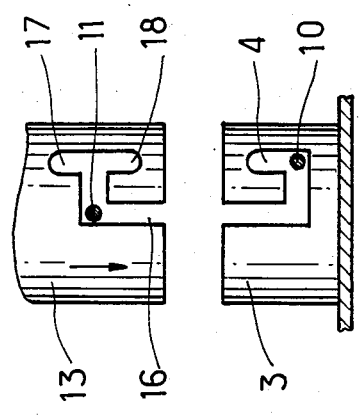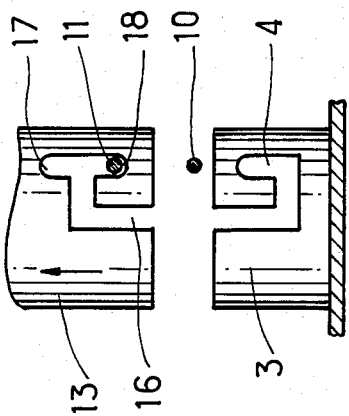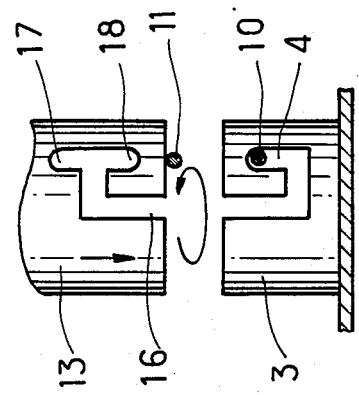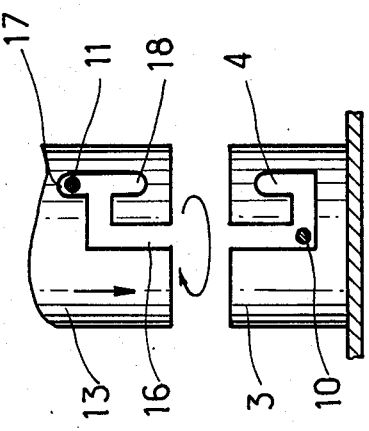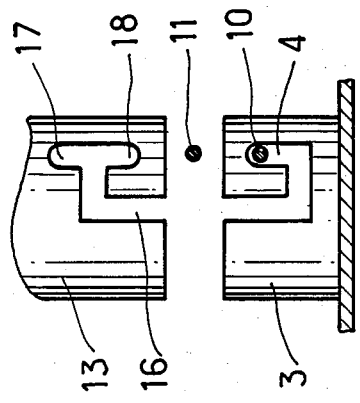

THERMAL SENSOR FOR CHEMICAL REACTOR

FIELD OF THE INVENTION

The present invention concerns thermal sensors, and aims at sensors designed for enamelled apparatus specifically, such as reactors utilized in the chemical industry, and which must be dismanteled from the exterior.

BACKGROUND OF THE INVENTION

It is known from the operationnal viewpoint, that such sensors must present, at the same time, a rapid response and the greatest possible precision within a large range of temperatures, of the order of 60° to +250° C.; in addition, from the point of view of construction, they should have a smooth surface, without joints and with a chemical resistance at least equivalent to the enamel covering the apparatus which they equip.

None of the devices known at present regroup all of these advantages.

Actually, to situate the state of the art, we can cite:

the system consisting of a thermocouple welded in an enamelled base: even though its response time is short, its precision is weak. Also it is not interchangeable.

the system consisting of a thermocouple or a resistance thermometer plunged into oil inclosed in a bulb: this one is interchangeable, but in this case, the thermal inertia of the system renders its response time too long.

the system consisting of a thermocouple or a resistance thermometer inside a coating of enamel: in this case, the response time is very short, but the realization is difficult, and it is not interchangeable, except by changing the whole enamelled part.

the system consisting of the sensor inserted in a cone glued by enamelling into a receptacle provided in the wall of the apparatus, it is not dismantable.

Systems are also proposed which are mounted from the interior of the apparatus, with the interposition of a teflon gasket. Such an assembly, as it is defined, represents in itself an inconvenience, since it does not allow for removal from the exterior of the apparatus, in this case it is not entirely enamelled.

SUMMARY OF THE INVENTION

The present invention permits the surmounting of all of these inconveniences thanks to a device which:

is installed in the interior of an element entirely enamelled, at the same time however being easily interchangeable from the exterior of the apparatus.

presents a response time as short as the welded thermocouple previously cited.

possesses the greatest possible precision, because it can be equipped with one or several resistance thermometers, thermocouples or thermistances.

To this effect, the system, according to the invention consists of, firstly, a sensor assembly immobilized against a thin enamelled barrier base, and secondly, an intermediate piece serving for this immobilization and finally, of a device for installing and removing from the exterior of the intermediate piece and the sensor assembly.

The intermediate piece is a sleeve which is characterized by two pairs of radial pins allowing it to be immobilized as desired by a slotted connector system and maintaining the sensor assembly against the flat base, or unlocked and extracted by freeing the sensor assembly.

For this purpose, the device for installation or removal has a symmetrical double slotted connector sleeve.

BRIEF DESCRIPTION OF DRAWINGS

The invention will now be described by referring to the accompanying drawings in which:

the FIG. 1 is an axial cut away view of the system according to the invention, the FIG. 2 is a exploded view of the same system and the FIGS. 3a to 3f on one part and 4a to 4e on the other part illustrate the installation and the extraction of the sensor assembly.

Figure 1:
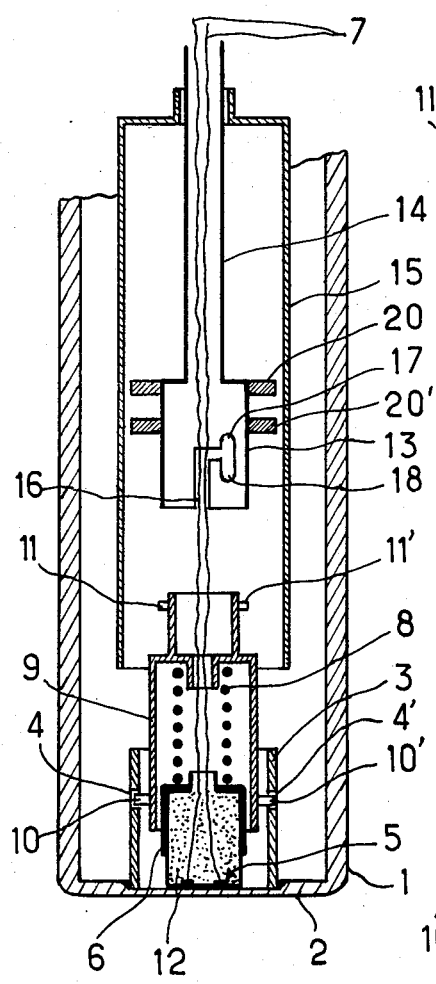
Figure 2:
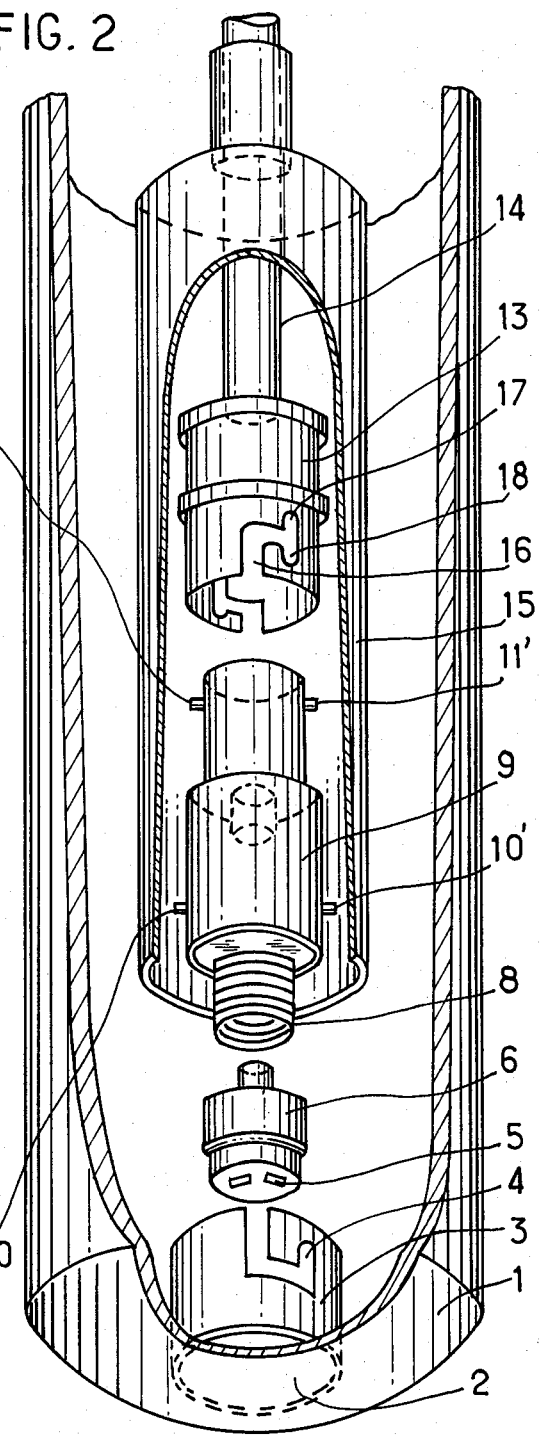

Refer initially to FIGS. 1 and 2, where the plunging cylinder 1 is represented, which can be the barrier or a thermal sleeve. This cylinder is of enamelled steel and its base 2 is flat, thin 1.5 mm and also enamelled. To this base 2 is welded a sleeve 3 of stainless steel, with a slotted connector 4—4'. Against the base of this sleeve the sensor 5, carried by the measuring head 6, to which the wires 7 are attached, is mounted.

In the installed position, as shown on FIG. 1, the measuring head 6 is held against the base by a spring 8 which presses against an intermediate piece's base, consisting of a sliding sleeve 9 between the head 6 and the socket 3 and having two pairs of transverse pins 10—10' and 11—11' located respectively in the lower and the upper parts. The pins 10—10' unite with slotted connector 4—4' to hold the sleeve 9 hooked to socket 3, thus to hold the sensor 5 against the anti-corrosion treated base 2.

According to a characteristic important to the invention, each sensor is within an insulating material mass 12 of a low thermal inertia and compression resistant, for example, such as foam glass. The response time is consequently, as short as that of the best existing systems, installed from the interior.

However, with respect to these systems, this type according to the invention, presents the remarkable advantage of being capable of installation from the exterior, thanks to a second slotted connector 13, mounted movable to the end of a sufficiently long rod 14, the whole being guided axially by a tube 15. A particularity of the slotted connector 16 of socket 13 is that it is doubled, presenting an opening upwards 17 and downwards 18.

These permit the installation and the removal of the thermal sensor following the procedures illustrated in FIGS. 3 and 4:

In these figures, for the convenience of design, parts 3 and 13 are represented at the same distance, with pins 10 and 11 at a variable opening, when, in reality, it is the reverse that occurs; actually the relation between the different elements in consideration are the same.

Figure 3A:
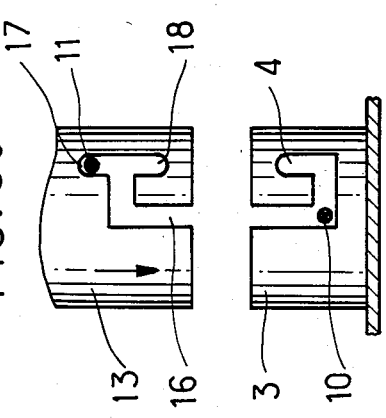
Figure 3D:
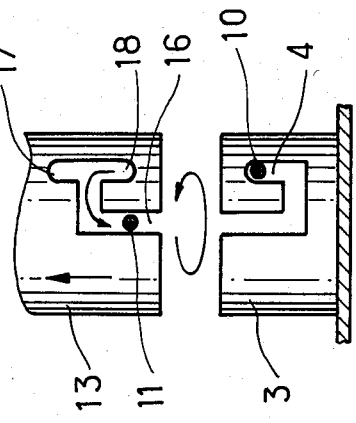
Figure 3B:
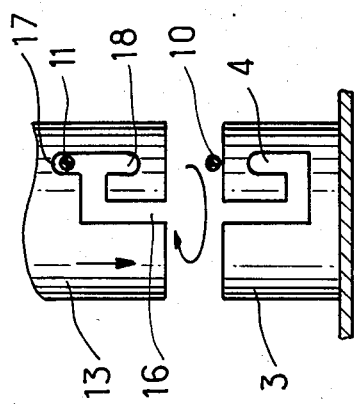
Figure 3E:
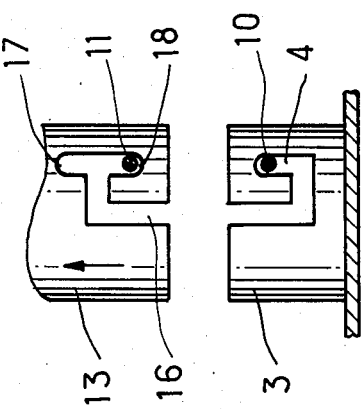
Figure 3C:
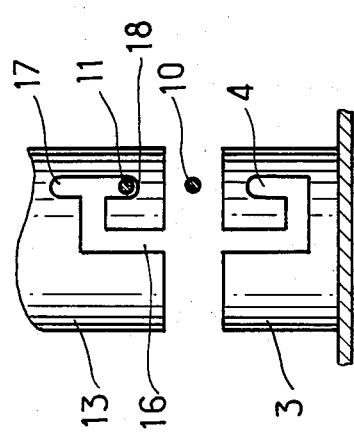
Figure 3F:
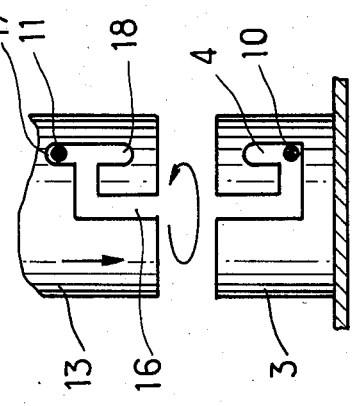

The process is the following: the wires are strung 7 in the interior of the tube 14, keeping them more or less tight, and then the assembly is inserted in the cylinder 1 until the guide tube 15 meets the fixed socket 3. This stage of operations is shown in FIG. 3a. Then, contact being established, the spring is compressed 8, and the openings are searched for 4—4', by turning to the right (clockwise) (FIG. 3b), and the pins 10—10' are engaged into the openings 4—4' (FIG. 3c). Afterwards, without releasing the pressure, turn in the opposite sense to lock in place (FIG. 3d). The locking in place is verified by pulling up (FIG. 3e), and the liberation of the socket 13 of pins 11—11' is effected by turning to the left (FIG.

3f). The socket 13 is then immobilized, assuring the contact of the measuring head 6 with the base 2.

To extract the socket 13, and the head 6, proceed in inverse order: the socket 13 is lowered until it contacts the pins 11—11' (FIG. 4a), the openings 16 are located by turning to the left (FIG. 4b), pressure is applied (FIG. 4c), then a turn to the right, which will, at the same time; connect sleeve 9 to the socket 13 and disengage socket 3 (FIG. 4d) and then sleeve 9 is removed, which then liberates at the same time, the measuring head 6.

It is understood that the measuring head can be equipped with resistance thermometers, thermistances, thermocouples, bulb thermometers or analog thermometers, in a number coincident with safety, in as much as their interchangeability be also as easy.

I claim:

1. A thermal sensor, in particular for measuring temperature in a chemical reactor comprising;
    a cylindrical shell of anti-corrosive material open at an outer end and closed by a thin base at an inner end,
    a cylindrical inner sleeve of smaller diameter then said shell welded to said base,
    a temperature measuring head removably received in said inner sleeve and positioned against said base of said shell and having lead wires, said temperature measuring head comprising at least one temperature sensing element in a compression resistant insulating mass of low thermal inertia in a casing,
    a connector having quick-disconnect means for connecting it with said inner sleeve and a compression spring acting between said connector and said measuring head to press said measuring head against said base of said shell, and
    a tubular stem extending from said connector out through said open outer end to the exterior of said shell, said stem receiving said lead wires of said measuring head.

2. A thermal sensor according to claim 1, in which said compression resistant insulating mass of low thermal inertia is foam glass.

3. A thermal sensor according to claim 5, in which said stem has at its inner end a socket with quick-disconnect means for connecting said socket with said connector.

4. A thermal sensor according to claim 1, further comprising a cylindrical guide sleeve having an inner end portion surrounding said inner sleeve of said shell and an outer end portion of reduced diameter slidably receiving said tubular stem.

5. A thermal sensor in particular for a chemical reactor comprising;
    a cylindrical shell of anti-corrosive material open at an outer end and closed by a thin base at an inner end,
    a cylindrical inner sleeve of smaller diameter than said shell welded to said base,
    a temperature measuring head removably received in said inner sleeve and positioned against said base of said shell and having lead wires,
    a connector having a quick-disconnect means for connecting it with said inner sleeve and a compression spring acting between said connector and said measuring head to press said measuring head against said base of said shell,
    a tubular stem extending from said connector to the exterior of said shell, said stem receiving said lead wires of said measuring head and having at its inner end, and
    a socket with quick-disconnect means for connecting said socket with said connector,
    said quick-disconnect means for connecting said connector with said inner sleeve comprising a bayonet-type joint and said quick-disconnect means for connecting said socket with said connector comprising opposite pins on said connector and opposite slots in said socket, each of said slots comprising an entrance portion parallel to the axis of said socket, a portion transverse to said entrance portion and an inner portion parallel to the axis of said socket and extending in both of opposite directions from said transverse portion.

* * * * *